April 17, 1951 C. PETERSON 2,549,519
CHAIN CUTTING MACHINE
Filed April 11, 1947 3 Sheets-Sheet 1

INVENTOR.
Carroll Peterson
BY
Harvey M. Gillespie
Atty.

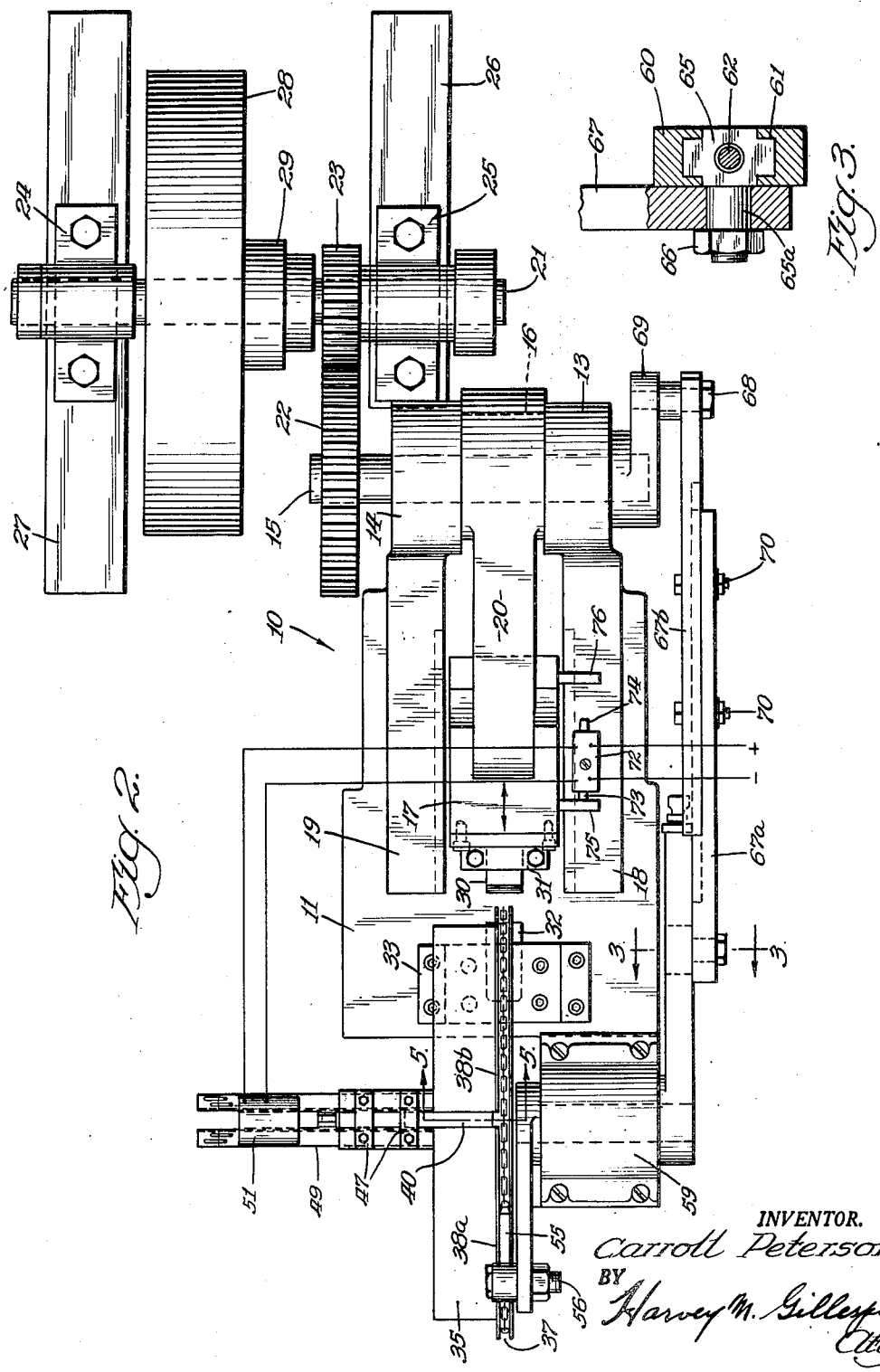

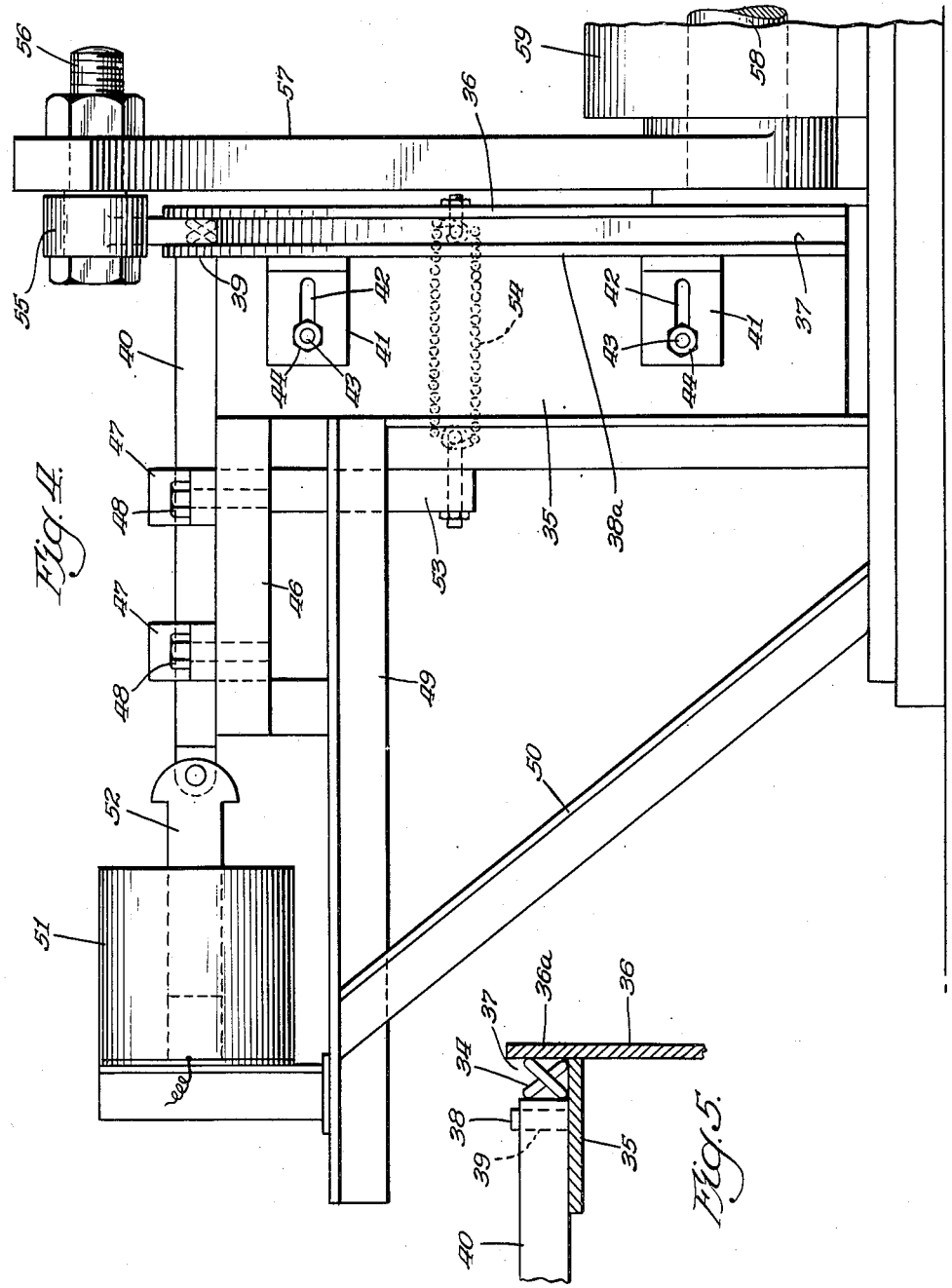

Patented Apr. 17, 1951

2,549,519

UNITED STATES PATENT OFFICE 2,549,519

CHAIN CUTTING MACHINE

Carroll Peterson, Hammond, Ind.

Application April 11, 1947, Serial No. 740,876

8 Claims. (Cl. 164—48)

This invention relates to certain new and useful improvements in shearing a chain into pieces of uniform length, and more especially to an automatic chain feed mechanism for advancing the chain in measured steps toward and through the shearing plane of the machine.

A principal object of the invention is to provide a chain feed mechanism which can satisfactorily handle long stretches of chain and which can easily and quickly be adjusted to feed the chain toward and through the shearing plane of the machine in accurately gauged steps which may be readily adjusted from time to time to meet changing requirements.

Another object is to provide an automatic chain feed mechanism of the above-indicated character which can quickly be re-adjusted to accommodate chains of widely varying sizes.

Where relatively short pieces of chains are required in large quantities, as in the production of cross members for tire chains, it is customary to fabricate a long chain and thereafter cut it into pieces of suitable length. The cutting of the chain at a rapid production rate, which necessarily entails accurate automatic feeding of the chain toward and through the shearing plane of the machine, has presented considerable difficulty arising out of the fact that, unlike most sheet metal, the chain has no rigidity and, therefore, cannot be pushed through the shearing plane. It must either be pulled through or fed by gravity; but the obvious arrangements for effecting that function have been found, for one reason or another, not well suited to rapid continuous production. The new automatic feed mechanism, of the present invention, meets all the requirements incidental to rapid production and is accurate and dependable in operation.

The invention is illustrated in the accompanying drawings wherein:

Fig. 2 is a plan view of the structure shown in Fig. 1.

Fig. 3 is an enlarged cross section taken at line 3—3 of Fig. 2.

Fig. 4 is an end elevation viewed from the left hand end of Fig. 1.

Fig. 5 is an enlarged fragmentary sectional view taken at line 5—5 of Fig. 2.

Figure 1:
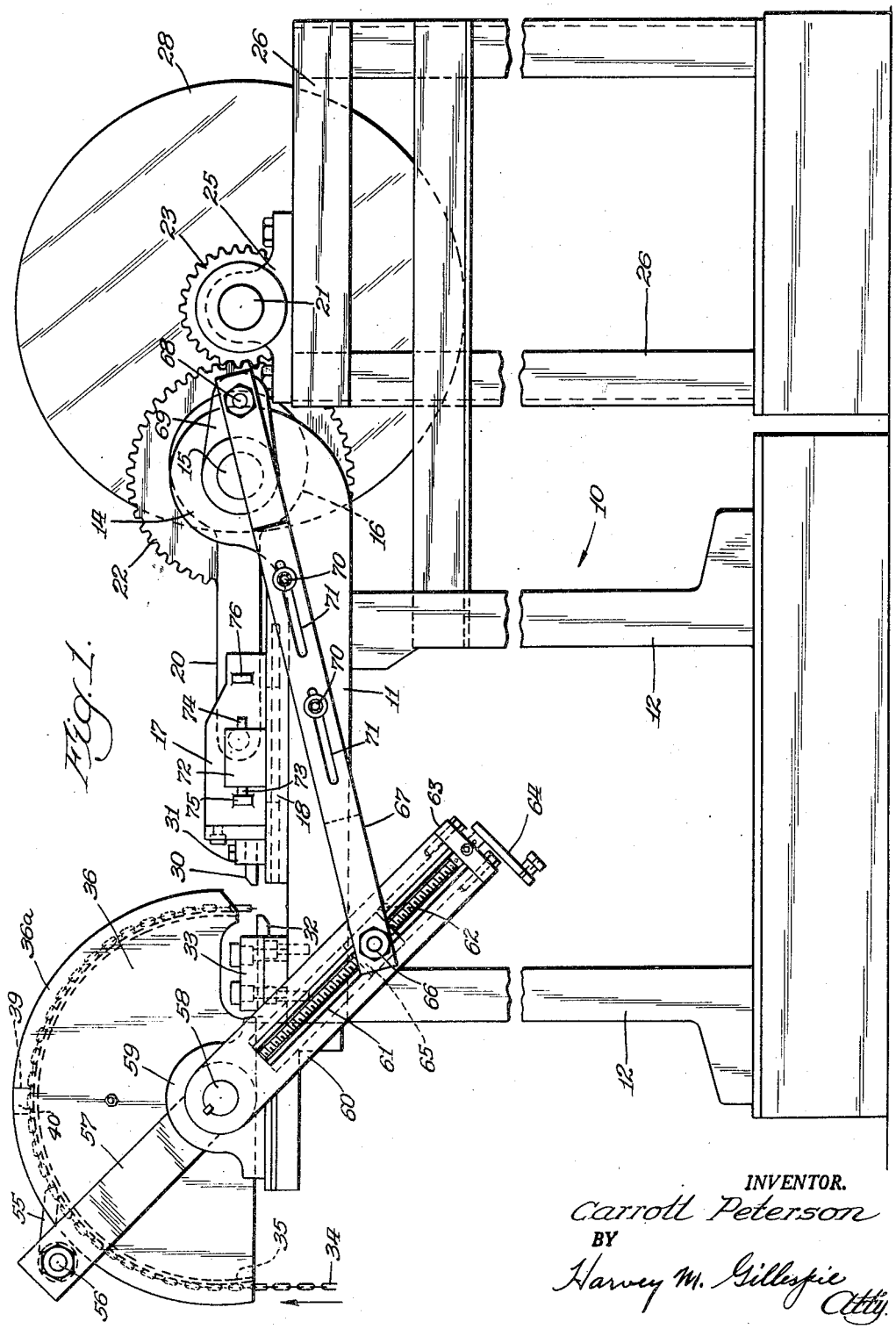
Fig. 1 is a side elevational view of a chain cutting machine equipped with an automatic chain feed mechanism constructed in accordance with this invention.

The chain cutting machine, per se, is of well known construction, but is illustrated herein, since it functions as an operating and timing mechanism for the chain feeding mechanism. The chain cutting machine as a whole is designated by the reference numeral 10. It comprises a bed 11 which is approximately of rectangular form, as viewed in Fig. 2, which is supported at a suitable elevation above floor level by a frame 12. A pair of main bearings 13 and 14 are mounted on the bed 11 and in these are journaled a main shaft 15 to which is secured an eccentric or crank 16. A crosshead or slide 17 is slidably mounted in fixed horizontal guides 18 and 19 and is pivotally connected to one end of a pitman or connecting rod 20. The other end of the pitman is bored to receive the eccentric 16.

The main shaft 15 is driven by a countershaft 21 through a pair of speed-reducing spur gears 22 and 23, the former being keyed to main shaft 15 and the latter to countershaft 21. Said countershaft is journaled in a pair of pillow blocks 24—25, which are supported on structural steel uprights 26—27 at a suitable elevation above the floor level.

A heavy flywheel 28 is mounted on countershaft 21 and is operatively clutched to said countershaft by a clutch 29. The above mechanism may be driven by a belt or any suitable source of power.

A shearing tool 30 is mounted in a tool holder 31 at the front end of slide 17 and is adjusted to co-operate with a complementary second shearing tool 32 which latter is rigidly mounted in a tool holder 33 attached to the top of bed 11. The horizontal plane common to the cutting edges of tools 30 and 32 is referred to herein as the shearing plane.

The chain 34, which is to be cut into pieces of specified length, is supported on a semicircular guide plate 35 which is welded or otherwise suitably secured along one edge to a semicircular vertical plate 36 by which it is supported. The latter, in turn, is suitably attached to and supported by bed 11, and its projects peripherally beyond the guide plate 35 to form a fixed flange 36a. This flange serves as one side-wall of a channel 37 for guiding chain 34. The chain is slidable lengthwise in the said channel 37 and moves therethrough in the direction indicated by the arrow shown adjacent the chain on Fig. 1. The chain being severed may be relatively long and is preferably arranged so that one end thereof may be passed over the semicircular guide.

Because the machine is intended to cut chains of widely differing sizes, it is necessary that the channel 37 be of variable width, and to that end there is provided a laterally movable flange 38 which consists of two complementary arcuate strips 38a and 38b, spaced apart at their adjacent ends to form a lateral opening 39 into channel 37 to admit one end of a plunger 40. The function of the plunger is to press chain 34 against the fixed side-wall 36a and thereby hold the chain against lengthwise movement through channel 37 during the actual cutting operation and during the reverse movement of the reciprocating cutter.

The two arcuate strips 38a and 38b, which together form the flange 38 defining one side-wall of channel 37, are each provided with a pair of horizontally projecting lugs 41 which rest on the top surface of guide plate 35 and are provided with elongate slots 42 through each of which passes a stud 43 which is provided with a nut 44. Said studs are threaded into guide plate 35 and they serve, with their nuts 44, to clamp the lugs 41 to guide plate 35, thus functioning to hold the arcuate strips 38a and 38b in any lateral positions to which they may be adjusted, within the limits permitted by slots 42. It will be apparent that the maximum and minimum widths of channel 37 are determined by the length of slots 42; and these limits are predicated upon the maximum and minimum sizes of chain to be dealt with.

Plunger 40 is reciprocable lengthwise toward and away from chain 34 and is supported on a plate 46 and guided by a pair of inverted U-shaped straps 47, secured to plate 46 by bolts 48. The plate 46 is, in turn, supported on a structural steel framework which comprises a horizontal platform 49 and one or more angular braces 50. Mounted on said platform is an electrical solenoid 51 having a plunger-armature 52 which is connected to plunger 40 and operative, upon energizations of the solenoid, to retract plunger 40 and to hold the same in retracted position as long as the solenoid remains energized.

An arm 53 depends from the plunger 40 and is connected at its lower end to one end of a spring 54 which is anchored at its other end to the vertical plate 36. Said spring 54 continuously urges plunger 40 toward chain 34 and is normally effective to clamp the chain against sidewall 36a to prevent lengthwise movement of the chain when the solenoid 51 is de-energized.

Chain 34 is fed step-by-step in the clockwise direction, as viewed in Fig. 1, by a pawl 55, the free end of which engages the chain while the other end is pivotally connected at 56 to an arm 57 which is keyed to a shaft 58 journaled in a pillow block 59.

Another arm 60 is keyed to shaft 58 at the end thereof remote from arm 57 and is provided with a lengthwise T-slot 61. The cross-sectional configuration of said arm 60 is shown in Fig. 3. A feedscrew 62 extends axially through said T-slot 61 and is journaled at the free end of the arm 60 in a bearing block 63 attached to said arm; and a hand crank 64 is secured to said feedscrew for rotating the same manually.

Mounted in and movable lengthwise of T-slot 61 and in threaded engagement with feedscrew 62 is a T-bolt 65 having a threaded shrank 65a carrying a nut 66. The said shank 65a serves as a trunnion on which is pivotally mounted one end of a connecting rod 67. The other end of the rod 67 is connected to a crankpin 68 attached to a crank 69 which is keyed to one end of main shaft 15. Connecting rod 67 is comprised of two parts, 67a and 67b which are overlapped and secured together by bolts 70 which pass through elongate slots 71 in part 67a, which enable the two parts 67a and 67b to be moved lenthwise relatively to each other for varying the center-to-center length of the connecting rod.

T-bolt 65 is movable lengthwise of arm 60 in response to rotation of feedscrew 62, and the center-to-center distance between shaft 58 and shank 65a is thereby adjustable to vary the length of the stroke or travel of the pawl 55 and consequently determines the length of the pieces of chain to be cut off.

The range of the feed mechanism as respects the maximum and minimum lengths of chain which can be cut off is determined, as will be apparent, by the length of T-slot 61, and since in this particular case the range is quite considerable, it is convenient to so construct the connecting rod 67 that its length can be varied, thus making it possible to control the limiting positions of the pawl.

As will be evident from the position of crank 69, pawl 55 is shown at the limit of its rearward or retractive stroke and about to move forward in response to further rotation of main shaft 15. Likewise, slide 17 is at the limit of its rearward stroke and about to move toward chain 34 and shearing tool 32. The chain is fed forwardly, in the clockwise direction, by pawl 55 during each forward movement of tool 30 and is advanced to the specified extent concurrently with the closing of the shearing tools. The part of the chain which lies to the right of pawl 55, during the forwarding ratching movement, will move under the force of gravity because its lack of rigidity does not permit of its being pushed by the pawl. It is desirable therefore that the end of the chain being severed shall be of sufficient weight to maintain taut that portion of the chain which is in advance of the pawl.

During each forward movement of pawl 55 and chain 34 it is essential that plunger 40 be held in retracted position so as not to interfere with the movement of the chain, and this means that solenoid 51 must be energized throughout at least a major portion of each forward movement of pawl 55, and preferably the whole thereof; but as soon as a forward movement of the pawl is completed and the pawl is about to commence its retractive movement, solenoid 51 must be de-energized to release plunger 40, thereby enabling it to be moved by spring 54 into gripping engagement with a chain.

Energization and de-energization of solenoid 51 is properly synchronized with the movements of pawl 55 and slide 17 by means of a limit switch 72. The switch may be of any approved construction adapted to be opened and closed at the proper times by a movable part of the machine 10. It is shown herein for convenience as mounted on guide 18 and as having a pair of movable switch members 73—74 located at opposite ends so as to be depressed, alternately, by adjustable lugs 75—76, which latter are bolted to slide 17 and, preferably, are adjustably movable lengthwise thereof. The limit switch 72 is so constructed as to close an electric circuit through the solenoid in response to a depression of switch member 73, and to open said circuit in response to a depression of switch member 74. With slide 17 at its rearmost position, as depicted in Fig. 2, the switch member 73 is depressed by lug 75 and the solenoid circuit is, accordingly, closed, thus effecting energization of solenoid 51. As a result, the plunger 40 is retracted and the chain 34 is free to move forwardly with pawl 55 concurrently with the succeeding forward movement of slide 17 and shearing tool 30.

When slide 17 is about to complete a forward movement, switch member 74 is engaged and depressed by lug 76, and the latter preferably is so positioned that the opening of the switch occurs just as the slide 17 reaches the end of its forward stroke, which events coincide with the conclusion of the forward movement of pawl 55. The resultant de-energization of solenoid 51 releases plunger 40 and thereby allows the same to be moved by spring 54 into clamping engagement with chain 34. Thus, it will be seen that the chain is firmly held against retractive movement throughout each rearward stroke of pawl 55, but is immediately released each time the pawl reaches the end of such a stroke, and is consequently free to move forwardly with the pawl.

While the invention is shown and described in connection with only one embodiment, it will be realized that there are many possible alternatives and modifications within the scope of the present disclosure. It will be understood, therefore, that the specific embodiment shown and described is intended only as one form of the invention and not as a limitation.

I claim:

1. In combination with a chain cutting machine having a movable shear element, a chain forwarding mechanism provided with reciprocating means including a pivoted arm and a detent carried thereon for engaging and moving the chain through the shearing plane of said shear, a guide for the chain, means for varying the chain feeding movement of said reciprocating means to vary the length of a chain section to be severed, a chain clamping element movable laterally of the guide for holding the chain against movement during the rearward movement of said chain forwarding mechanism, operative connections between said reciprocating means and a movable part of the chain cutting machine for operating the said reciprocative means in timed relation with the movement of said shear element, and means actuated by the movement of said cutting machine for operating the chain clamping elements in timed relation with the movement of said shear.

2. The combination with a power-driven chain-cutting shear, of guide means adapted to guide a chain downwardly through the shearing plane of said shear, a reciprocatory chain feeding device synchronized with said shear and including a pawl arranged to move lengthwise of said guide means toward and away from said shearing plane in measured steps, said pawl being operative to engage said chain and move the same along said guide means toward said shearing plane during each forward movement of the pawl, a spring-actuated element normally operative to grip said chain to prevent movement thereof lengthwise of the guide means, and means synchronized with said shear for deactivating said element concurrently with each forward movement of the pawl whereby to enable the chain to move with the pawl only during the forward movements of the pawl.

3. The combination with a power-driven chain-cutting shear, of guide means adapted to guide a chain downwardly under gravity through the shearing plane of said shear, a reciprocatory chain feeding device synchronized with said shear and operative to advance the chain in measured steps along said guide means toward the shearing plane of said shear, said device being movable lengthwise of the chain toward and away from said shearing plane, alternately, spring-pressed plunger normally operative to grip said chain to prevent movement thereof lengthwise of the guide means, and means synchronized with said shear for retracting said plunger out of gripping engagement with the chain concurrently with each forward movement of said feeding device and for holding said plunger retracted throughout each of said forward movements.

4. The combination with a power-driven chain-cutting shear, of guide means adapted to guide a chain downwardly under gravity through the shearing plane of said shear, a reciprocatory chain feeding device synchronized with said shear and operative to advance the chain in measured steps along said guide means toward said shearing plane, said device being movable lengthwise of the chain toward and away from said shearing plane, alternately, a spring-pressed plunger normally operative to grippingly engage said chain to prevent movement thereof lengthwise of the guide means, an electromagnet operative, when energized, to retract said plunger and thus release said chain, in an energizing circuit for said electromagnet and arranged to be operated synchronously with said shear and said feeding device whereby to energize said electromagnet at the commencement of each forward stroke of said device and to de-energize said electromagnet at the commencement of each retractive stroke of said device.

5. In combination, a power-driven shear including a main shaft, a reciprocatory slide operatively connected to said main shaft for actuation thereby, a shearing tool carried by and reciprocable with said slide, a fixed shearing tool arranged to cooperate with the first-mentioned shearing tool for cutting a chain, and automatic chain feed mechanism comprising an arcuate chain guide arranged to guide a chain first upwardly and then downwardly under gravity through the shearing plane of said shearing tools, an arm arranged to reciprocate about a center of rotation concentric with said guide, a connecting rod and crank interconnecting said arm with said main shaft for reciprocating said arm synchronously with the movements of said slide, a pawl carried by said arm and movable thereby in an arcuate path along said guide, said pawl being operative to engage the chain and move the same forwardly along the guide throughout each forward stroke of the pawl, the arrangement being such that the chain is moved toward and through the shearing plane in measured steps during each open period of the shear, and means operatively associated with the shear for restraining lengthwise movement of the chain only during the retractive strokes of said pawl.

6. The combination with a power-driven chain-cutting shear, of an arcuate guide adapted to guide a chain lengthwise, first upwardly and then downwardly under gravity through the shearing plane of the shear, a pawl synchronized with said shear and operative to move the chain lengthwise along said guide in measured steps toward the shearing plane, a spring-pressed element normally operative to grip said chain and thus prevent lengthwise movement thereof along said guide, an electromagnet operative, when energized, to retract said element out of gripping engagement with said chain, and a circuit for said electromagnet including a source of current and a switch, said switch being arranged for operation by said shear, and synchronously therewith, for closing said circuit at the commencement of each forward movement of said pawl, and for opening said circuit at the commencement of each retractive movement of said pawl.

7. The combination with a power-driven chain-cutting shear, of a chain guide comprising a chain-supporting plate which is curved in the vertical plane to guide the chain first upwardly and then downwardly toward the shearing plane of the shear, a fixed flange attached to said plate and defining one side-wall of the guide, a second flange adjustably movable toward and away from said first flange and forming another side-wall of the guide, a pawl movable reciprocably in an arcuate path along said guide and operative to engage the chain and move the same in measured steps along said guide toward the shearing plane, means for driving said pawl synchronously with said shear, and an electromagnetically actuated element arranged for operation synchronously with said shear for gripping said chain to prevent lengthwise movement thereof during only the retractive strokes of said pawl.

8. In combination, a power-driven chain-cutting shear including a main shaft, a tool slide operative by said main shaft, a semicircular chain guide operation to guide a chain, first upwardly and then downwardly through the shearing plane of the shear, and an automatic chain-feed mechanism comprising a shaft located concentrically with the arcuate curvature of said guide, a first arm secured to said shaft and rotatable therewith, a pawl carried by said first arm and reciprocably movable thereby in an arcuate path along said guide and operative throughout each forward stroke to move said chain forwardly toward said shearing plane, a second arm attached to said shaft for rotating the same reciprocally, a feedscrew carried by said second arm and extending lengthwise thereof, a nut carried by said second arm and movable lengthwise thereof, a nut carried by said second arm and movable lengthwise thereof by said feedscrew, a connecting rod pivotally connected at one end to said nut, and a crank attached to said main shaft and pivotally connected to the other end of said connecting rod, the length of stroke of said pawl being variable by rotating said feedscrew and thus moving said nut lengthwise of said second arm.

CARROLL PETERSON.

REFERENCES CITED

The following references are of record in the file of this patent:

UNITED STATES PATENTS

| Number | Name | Date |
|---|---|---|
| 748,853 | Faltermeyer | Jan. 5, 1904 |
| 1,447,736 | Soderstrom | Mar. 6, 1923 |